United States Patent
Wang et al.

(10) Patent No.: US 9,114,806 B2
(45) Date of Patent: Aug. 25, 2015

(54) SYSTEM AND METHOD FOR CONTROLLING BATTERY POWER BASED ON PREDICTED BATTERY ENERGY USAGE

(71) Applicant: FORD GLOBAL TECHNOLOGIES, LLC, Dearborn, MI (US)

(72) Inventors: Xiaoyong Wang, Novi, MI (US); Wei Liang, Farmington Hills, MI (US); Qing Wang, Canton, MI (US); Ryan Abraham McGee, Ann Arbor, MI (US); Ming Lang Kuang, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 14/160,709

(22) Filed: Jan. 22, 2014

(65) Prior Publication Data
US 2015/0203096 A1    Jul. 23, 2015

(51) Int. Cl.
| | |
|---|---|
| *B60W 10/06* | (2006.01) |
| *B60W 20/00* | (2006.01) |
| *B60W 10/26* | (2006.01) |
| *B60K 6/22* | (2007.10) |

(52) U.S. Cl.
CPC ............. *B60W 20/106* (2013.01); *B60W 10/06* (2013.01); *B60W 10/26* (2013.01); *B60W 20/1088* (2013.01); *Y10S 903/93* (2013.01)

(58) Field of Classification Search
CPC .............. B60K 6/02; B60K 6/04; B60K 6/22; H01M 10/46; G06F 17/00; B60L 11/00; B60W 10/06
USPC ................................ 701/22, 48, 36; 180/65.2
See application file for complete search history.

(56) References Cited

U.S. PATENT DOCUMENTS

| | | | |
|---|---|---|---|
| 7,360,615 B2* | 4/2008 | Salman et al. ........... | 180/65.265 |
| 7,831,343 B2 | 11/2010 | Formanski et al. | |
| 8,041,495 B2 | 10/2011 | Kozarekar et al. | |
| 8,538,621 B2* | 9/2013 | Ross et al. ................... | 701/29.1 |
| 2002/0188387 A1* | 12/2002 | Woestman et al. ............. | 701/22 |
| 2005/0228553 A1* | 10/2005 | Tryon ............................. | 701/22 |
| 2010/0204863 A1* | 8/2010 | Sakamoto et al. .............. | 701/22 |
| 2011/0184600 A1* | 7/2011 | Kristinsson et al. ........... | 701/22 |
| 2011/0251744 A1* | 10/2011 | Amano et al. .................. | 701/22 |

* cited by examiner

*Primary Examiner* — Tan Q Nguyen
(74) *Attorney, Agent, or Firm* — David B. Kelley; Brooks Kushman, P.C.

(57) ABSTRACT

A system and method for controlling battery power in a hybrid vehicle for a given driver demand that balances battery state of charge and battery capacity limits while operating the engine at a system efficient engine power. Predictive information may be used to predict battery energy usage during a future time window that indicates a charging opportunity (excess power will be absorbed by the battery) or a boosting opportunity (battery power will be discharged). Based on this information and the current state of charge of the battery, an associated battery power for a given driver demand is determined.

17 Claims, 3 Drawing Sheets

SYSTEM AND METHOD FOR CONTROLLING BATTERY POWER BASED ON PREDICTED BATTERY ENERGY USAGE

TECHNICAL FIELD

The present disclosure relates to systems and methods for controlling battery power in a hybrid electric vehicle based on predicted battery energy usage.

BACKGROUND

A hybrid electric vehicle (HEV) powertrain may include two power sources for delivering driving power to vehicle traction wheels. In general, these power sources may be divided into two broad categories: mechanical and electrical. A mechanical power source may include, for example, an internal combustion engine that outputs mechanical power to the vehicle wheels through one or more sets of transmission gears. An electrical power source may include one or more electric machines, such as an electric motor or a motor/generator. The electric motor may receive electrical power from another generator, a battery, or other source of electrical power.

The two power sources must be integrated to work together seamlessly to meet a driver's demand for power within system power constraints while optimizing total powertrain system efficiency and performance. This requires a coordination of control of the two power sources. Because this type of arrangement provides multiple power flow paths to the vehicle wheels, the engine speed can be optimized for the maximum system efficiency for a given driver demand for power. However, when the engine is commanded to operate at a power corresponding to maximum system efficiency, the power surplus or deficit is absorbed by the battery. Because of battery capacity limits and/or constraints combined with the need to balance the battery state of charge (SOC), it may not be feasible to always operate the engine at a power corresponding to maximum system efficiency for a given driver demand.

Optimizing HEV powertrain operation remains a difficult challenge. HEV energy management is the core strategy for efficient powertrain operation. Usually for a given battery power request, the rest of the energy management is a static optimization problem. The determination of battery power request is often heuristic and thus sub-optimal, resulting in sub-optimal fuel economy. As such, there exists a need for more accurate and robust methods for determining the battery power request for a given driver demand that balances battery SOC and allows the engine to operate at a power that increases system efficiency as much as possible during a drive cycle.

SUMMARY

A system and method for controlling battery power in a hybrid vehicle for a given driver demand that balances battery SOC and battery capacity limits while operating the engine at a system efficient engine power is disclosed. Specifically, embodiments disclosed herein use predictive information to estimate and/or predict battery energy usage during a future time window that indicates a future charging opportunity (excess power will be absorbed by the battery) or a boosting opportunity (battery power will be discharged). Based on this information and the current state of charge of the battery, an associated battery power for a given driver demand may be determined that balances the need to operate the system at a system efficient engine power, while maintaining a balanced battery SOC.

In one embodiment, a hybrid vehicle includes an engine, a battery and a controller configured to control battery power based on a current battery state of charge and a predicted battery energy usage associated with operation of the engine at system efficient engine power during a future time window. The system efficient engine power is based on a predicted vehicle speed and driver demand. The controller is also configured to operate the battery at a system efficient battery power when the system efficient battery power is below zero, the predicted battery energy usage is boosting, and the current battery state of charge exceeds an associated threshold. The predicted battery energy usage is determined from predictive information that may include map data, road attributes, real-time traffic information, historic traffic information, and past driving history.

In another embodiment, a hybrid vehicle includes an engine, a battery and a controller configured to control battery power based on a current battery state of charge and a predicted battery energy usage. The predicted battery energy usage is based on a difference between operation of the engine at system efficient engine power and operation of the engine at charge neutral engine power associated with zero battery power. Moreover, the controller is also configured to operate the battery at a system efficient battery power when the current battery state of charge is less than an associated threshold, the system efficient battery power is greater than zero, and the predicted battery energy usage is charging. The controller is further configured to set the battery power to zero and control the engine to deliver wheel power to meet driver demand when the current battery state of charge is less than an associated threshold, a system efficient battery power is greater than zero, and the predicted battery energy usage is boosting.

In yet another embodiment, a method for controlling a hybrid vehicle having an engine and a battery includes controlling battery power based on a current battery energy usage associated with operation of the battery at system efficient battery power relative to a predicted battery energy usage associated with operation of the engine at system efficient engine power during a future time window. The method also includes controlling the battery to operate at the system efficient battery power when a current battery state of charge is less than an associated threshold, the system efficient battery power is greater than zero, and the predicted battery energy usage is charging. The method further includes controlling the engine to deliver wheel power to meet driver demand when a current battery state of charge exceeds an associated threshold, the system efficient battery power is less than zero, and the predicted battery energy usage is charging. The predicted battery energy usage is further based on a difference between operation of the engine, over the future time window, at system efficient engine power and operation of the engine at charge neutral engine power associated with zero battery power.

Embodiments according to the present disclosure provide various advantages. For example, various embodiments balance the battery SOC without exceeding battery capacity limits. In addition, other embodiments facilitate operation of the engine at a power corresponding to maximum system efficiency. The above advantages and other advantages and features will be readily apparent from the following detailed

DETAILED DESCRIPTION

As required, detailed embodiments of the claimed subject matter are disclosed herein; however, it is to be understood that the disclosed embodiments are merely exemplary and may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments of the claimed subject matter.

Figure 1:
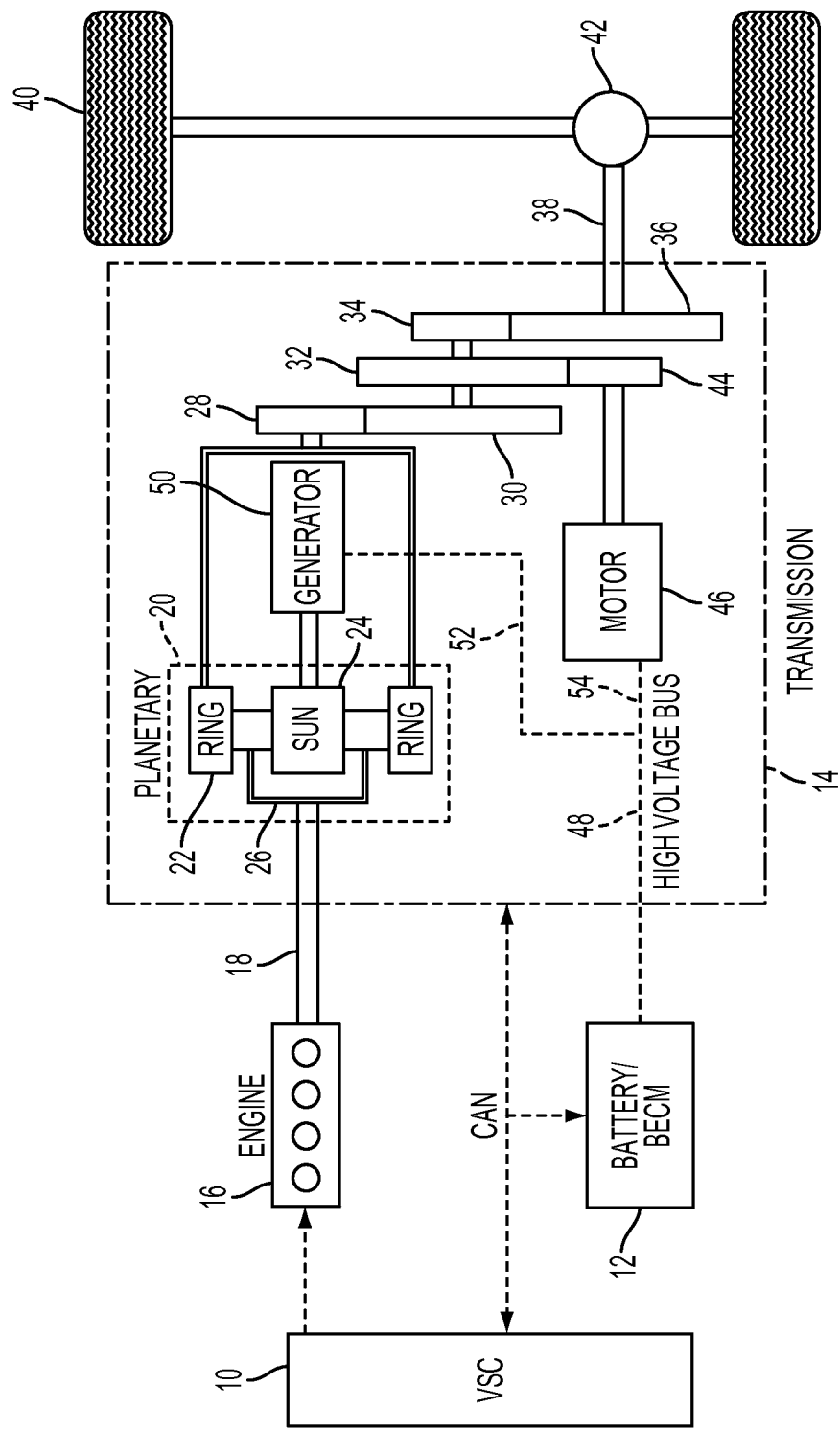
FIG. 1 is a schematic representation of a powersplit hybrid vehicle powertrain system configuration.

Referring to FIG. 1, a HEV powertrain having an internal combustion engine 16, controlled by a vehicle system controller (VSC) 10, to distribute torque through torque input shaft 18 to transmission 14 is schematically illustrated. The VSC 10, a battery and battery energy control module (BECM) 12, and a transmission 14, together with a motor-generator subsystem, comprise a control area network (CAN).

The transmission 14 includes a planetary gear unit 20, which comprises a ring gear 22, a sun gear 24, and a planetary carrier assembly 26. The ring gear 22 distributes torque to step ratio gears comprising meshing gear elements 28, 30, 32, 34, and 36. A torque output shaft 38 for the transmission 14 is drivably connected to vehicle traction wheels 40 through a differential and axle mechanism 42. Gears 30, 32, and 34 are mounted on a countershaft, with gear 32 engaging a motor-driven gear 44. Electric motor 46 drives gear 44, which acts as a torque input for the countershaft gearing. The battery delivers electric power to the motor through power flow path 48, 54. Generator 50 is connected electrically to the battery and to the motor 46 in a known fashion as shown at 52.

The powersplit powertrain system of FIG. 1 may be operated in a variety of different modes as is appreciated by those skilled in the art. As shown, there are two power sources for the driveline. The first power source is a combination of the engine and generator subsystems, which are connected together using the planetary gear unit 20. The other power source involves the electric drive system including the motor 46, the generator 50, and the battery 12, where the battery 12 acts as an energy storage medium for the generator 50 and the motor 46.

Figure 2:
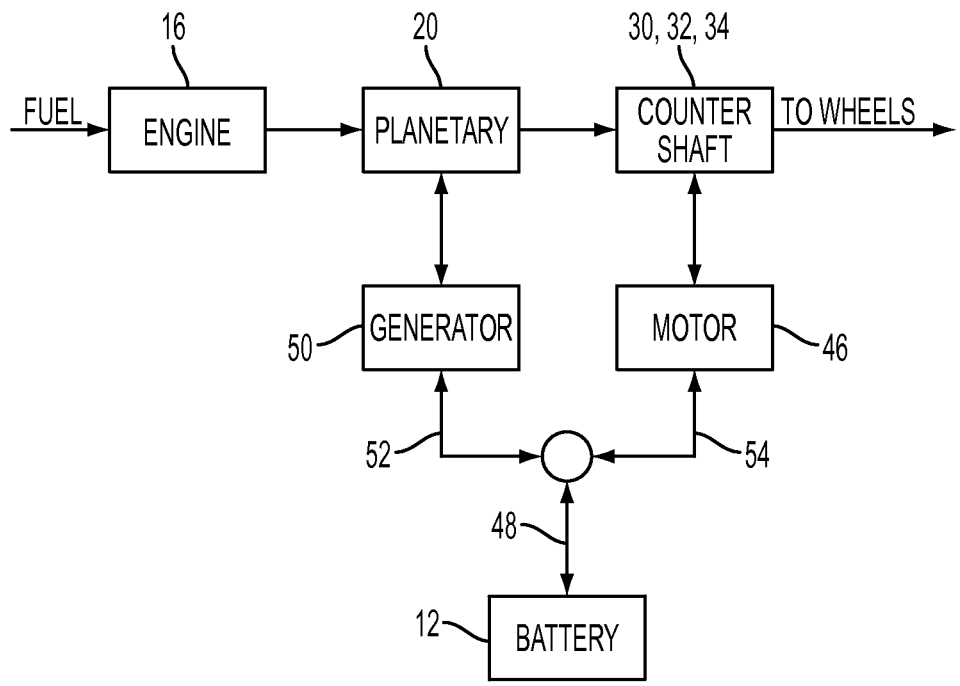
FIG. 2 is a schematic representation, in block diagram form, of a powertrain system power flow diagram.

The power flow paths between the various elements of the powersplit powertrain diagram shown in FIG. 1 are illustrated in FIG. 2. Fuel is delivered to the engine 16 under the control of the operator in a known fashion using an engine throttle. Engine 16 delivers power to the planetary gear unit 20. The available engine brake power is reduced by accessory loads. Power is delivered by the planetary ring gear to the countershaft gears 30, 32, 34. Power output from the transmission 14 drives the wheels. Generator 50, when acting as a motor, can deliver power to the planetary gearing 20. When acting as a generator, generator 50 is driven by the planetary gearing 20. Similarly, power distribution between the motor 46 and the countershaft gears 30, 32, 34 can be distributed in either direction.

As shown in FIGS. 1 and 2, engine power output can be split into two paths by controlling generator 50. In operation, the system determines the driver's demand for torque and achieves the optimal split of power between the two power sources. The controller determines when and how much power and torque each power source needs to meet driver demand and to achieve a specified vehicle performance. For a given engine power, the engine speed can be optimized for the maximum system efficiency. Further, the engine power can be optimized to deliver optimal fuel consumption for a given drive cycle because the battery absorbs any power surplus or deficit. However, operation of the engine at a power corresponding to maximum system efficiency is not always feasible because of battery capacity limits and battery state of charge (SOC).

Accordingly, embodiments in the present disclosure disclose methods for controlling battery power in a hybrid vehicle that facilitates operation of the engine at a power corresponding to maximum system efficiency, for a given speed and power request, through use of predictive information, while maintaining a balanced SOC and not exceeding battery capacity limits. In general, the control strategies disclosed herein control battery power based on a current battery energy usage associated with operation of the battery at system efficient battery power relative to a predicted battery energy usage associated with operation of the engine at system efficient engine power during a future time window. More specifically, embodiments disclosed herein use predictive information to estimate and/or predict battery energy usage during a future time window that indicates a future charging opportunity (excess power will be absorbed by the battery) and/or a future boosting opportunity (battery power will be discharged) in the future time window (e.g., the next T seconds). As previously discussed, the predicted battery energy usage corresponds to the battery energy required to operate the engine at a system efficient engine power during the future time window.

Figure 3:
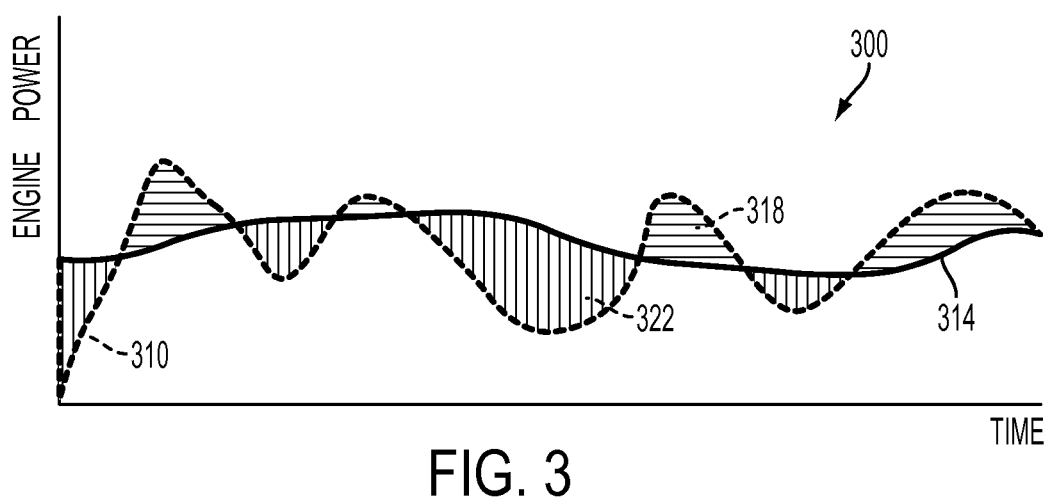
FIG. 3 illustrates an engine power profile corresponding to system efficiency in accordance with embodiments of the present disclosure.

As mentioned above and described in more detail below, predictive information is used to estimate and/or predict battery energy usage during a future time window. Predictive information may be collected from a variety of sources and related technologies. The rapid development and deployment of technologies such as Global Positioning Systems (GPS), Geographic Information Systems (GIS), Vehicle-to-Vehicle (V2V) Communications, Vehicle-to-Infrastructure (V2I) Communications, and traffic flow monitoring systems greatly increase the predictability of vehicle speed profiles. Once an intended route for a vehicle is available, a vehicle speed profile may be constructed based on map data, road attributes, real-time and historic traffic information, and past driving history of the driver. With these capabilities, the battery energy usage during a future time window can be estimated and/or predicted. FIG. 3, for example, illustrates an example engine power profile that depicts engine operation at maximum powertrain system efficiency during a time window.

With continual reference to FIG. 3, a system efficient engine power curve 314 corresponding to maximum system efficiency for a given speed and power request is shown. In addition, a charge neutral engine power curve 310 corresponding to the power to be produced by the engine to deliver the wheel power necessary to meet driver demand when there is no battery power is also illustrated. The charge neutral engine power 310 consists of wheel power and power loss along the drivetrain. The fast changing characteristic of the charge neutral engine power 310 is a reflection of the driver pedal inputs in real world driving. To be efficient, the system sometimes favors lower power and other times it favors power higher than the charge neutral engine power (the power required by engine when battery power request is zero). If the engine is commanded to operate at a system efficient engine power 314, the battery absorbs the power surplus or deficit. For example, the area 322 below the system efficient engine power curve 314 (corresponding to maximum system efficiency) indicates a battery charge opportunity. Essentially, this means that if the system is operated along the system efficient engine power curve 314, the engine is operating at a power higher than driver demand and the battery has to take the extra power in order not to exceed the wheel power request. Whereas, the area 318 above the system efficient engine power curve 314 represents electric boost opportunities where the engine is operated at less power and the battery has to supply the extra power required to meet driver demand.

At each moment, because the speed and driver power request are known, the system efficient battery power corresponding to a system efficient engine power is known and/or can be calculated. The challenge is determining if the battery should be operated at the system efficient battery power taking into account battery capacity and SOC limits. Through use of predictive information, the charge neutral engine power 310 required to meet driver demand and the system efficient engine power 314 corresponding to maximum system efficiency can be calculated over a future time window. In addition, the predicted battery energy usage corresponding to the battery energy required to operate the engine at system efficient engine power during the future time window may also be estimated using various methods. One method for estimating and/or predicting battery energy usage may include, for example, integrating the difference between the system efficient engine power 314 and the charge neutral engine power 310 over the future time window. For example, if the predicted battery energy usage over the next T seconds is charging, it indicates that the system will have charging opportunities in the next T seconds. Likewise, if the predicted battery energy usage is boosting, it indicates that the system will have future boosting and/or discharging opportunities in the next T seconds. With this information, the controller may determine the battery power for a given speed and power request that balances battery SOC and capacity limits with system efficiency. This is explained in greater detail in FIG. 4.

Figure 4:
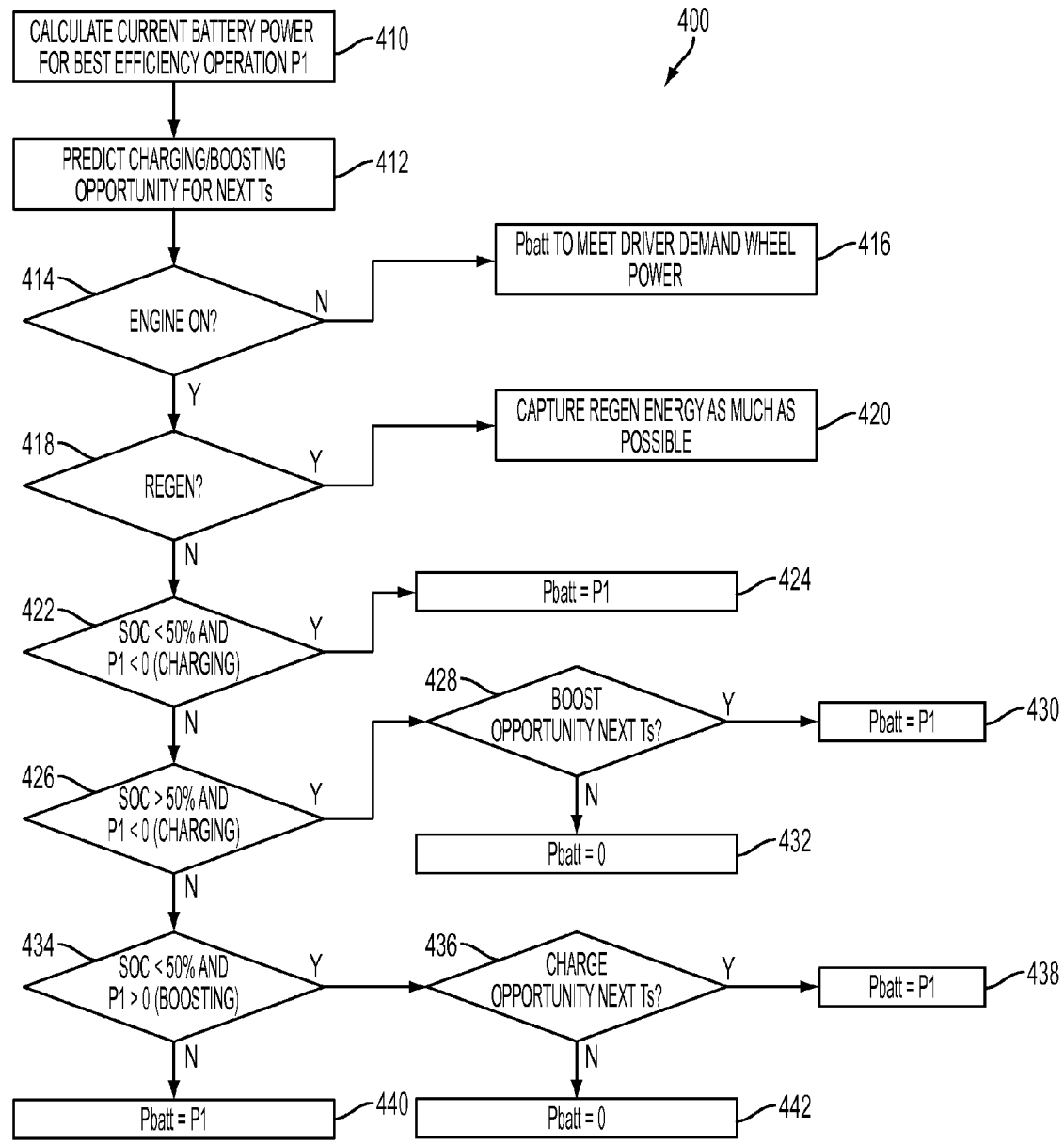
FIG. 4 is a flow chart illustrating a method for determining a battery power request associated with system efficiency in accordance with an exemplary embodiment of the present disclosure.

Referring to FIG. 4, a system and/or method for controlling battery power in a hybrid vehicle that optimizes powertrain efficiency and maintains a balanced SOC according to an exemplary embodiment of this disclosure is shown. As those of ordinary skill in the art will understand, the functions represented by the flow chart blocks may be performed by software and/or hardware. Depending upon the particular processing strategy, such as event-driven, interrupt-driven, etc., the various functions may be performed in an order or sequence other than illustrated in the Figure. Similarly, one or more steps or functions may be repeatedly performed, although not explicitly illustrated. In one embodiment, the functions illustrated are primarily implemented by software, instructions, or code stored in a computer readable storage medium and executed by one or more microprocessor-based computers or controllers to control operation of the vehicle.

As shown in FIG. 4, the control strategy 400 begins at block 410 where a system efficient battery power P1 corresponding to operation of the engine at a system efficient engine power is calculated for a given speed and power demand. At block 412, predictive information is used to estimate and/or predict battery energy usage during a future time window Ts that indicates a charging and/or boosting opportunity. The control strategy then determines if the engine is on at block 414. If the engine is off, then the battery delivers all the power required to meet driver demanded wheel power, as shown at 416. But, if the engine is on at 414, the control strategy moves on to block 418. If the vehicle is engaged in regenerative braking, as shown at block 418, then the vehicle captures regenerative energy as much as possible 420. If no regenerative braking at block 418, then the control strategy moves on to block 422. If the SOC is less than an associated threshold, and the system efficient battery power P1 is less than zero (which indicates battery charging is desired to operate the system efficiently), then the controller operates the battery at a battery power equal to the system efficient battery power P1, as shown at block 424. In this embodiment, the associated threshold is calibrated to fifty percent in order to maintain a balanced SOC, however, the associated threshold is not limited to this particular value and can be calibrated to any value that is advantageous for a given operating strategy and/or condition. With reference again to block 422, if the SOC is not less than fifty percent or the system efficient battery power is not less than zero, then the control strategy moves on to block 426.

As shown at block 426, if the SOC is greater than fifty percent and the system efficient battery power P1 is less than zero, then the control strategy looks to see whether the predicted battery energy usage indicates a boosting opportunity during the future time window Ts 428. If the predicted battery energy usage indicates a boosting opportunity (which indicates battery discharging is desired to operate the system efficiently), then the controller operates the battery at a battery power equal to the system efficient battery power P1, as shown at block 430. However, if the predicted battery energy usage indicates that there is not a boosting opportunity in the future time window Ts, then the battery power is set at zero and the engine delivers all the power to the wheels that is required to meet the driver demand without use of the battery, as shown at block 432. The control strategy moves onto block 434 if the SOC is less than fifty percent or the system efficient battery power P1 is greater than zero at block 426.

At block 434, if the SOC is less than fifty percent and the system efficient battery power P1 is greater than zero, the control strategy looks to see if the predicted battery energy usage indicates a charging opportunity in the future time window Ts, as shown at block 436. If the predicted battery energy usage indicates a charging opportunity, then the controller operates the battery at a battery power equal to the system efficient battery power P1, as illustrated at block 438. Whereas, if predicted battery energy usage does not indicate a charging opportunity in the future time window Ts, then the battery power is set at zero and the engine alone is used to power traction wheels to meet driver demand, as shown at 442. Lastly, if at block 434, the SOC is greater than fifty percent or the system efficient battery power P1 is not greater than zero, then the controller operates the battery at a battery power equal to the system efficient battery power P1 440.

The advantage of this method is that the control strategy always tries to balance SOC. The control strategy will operate the engine at maximum system efficiency as long as the future time window contains opportunities to compensate for its current operation. Through use of these systems and methods, a HEV powertrain minimizes its fuel consumption and maintains battery SOC. In addition, the length of the future time window may affect the optimality. However, in general for an HEV with a relatively small battery, a short time window is sufficient to achieve these objectives.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments discussed herein that are described as less desirable than other embodiments or prior art implementations with respect to one or more characteristics are not outside the scope of the disclosure and may be desirable for particular applications.

What is claimed is:

1. A hybrid vehicle comprising:
    an engine;
    a battery; and
    a controller configured to control battery power based on a current battery state of charge and a predicted battery energy usage associated with operation of the engine at system efficient engine power during a future time window, wherein the controller is further configured to operate the battery at a system efficient battery power when the current battery state of charge is less than an associated threshold and the system efficient battery power is less than zero.

2. The hybrid vehicle of claim 1, wherein the system efficient engine power is based on a predicted vehicle speed and driver demand.

3. The hybrid vehicle of claim 1, wherein the predicted battery energy usage is determined from predictive information, wherein predictive information includes at least one of map data, road attributes, real-time traffic information, historic traffic information, and past driving history.

4. The hybrid vehicle of claim 1, wherein the controller is further configured to operate the battery at a system efficient battery power when the system efficient battery power is below zero, the predicted battery energy usage is boosting, and the current battery state of charge exceeds an associated threshold.

5. The hybrid vehicle of claim 1, wherein the controller is further configured to set the battery power to zero and control the engine to deliver wheel power to meet driver demand when the current battery state of charge exceeds an associated threshold, a system efficient battery power is less than zero, and the predicted battery energy usage is charging.

6. A hybrid vehicle comprising:
    an engine;
    a battery; and
    a controller configured to control battery power based on a current battery state of charge and a predicted battery energy usage, wherein the predicted battery energy usage is based on a difference between operation of the engine at system efficient engine power and operation of the engine at charge neutral engine power associated with zero battery power.

7. The hybrid vehicle of claim 6, wherein the controller is further configured to operate the battery at a system efficient battery power when the current battery state of charge is less than an associated threshold, the system efficient battery power is greater than zero, and the predicted battery energy usage is charging.

8. The hybrid vehicle of claim 6, wherein the controller is further configured to set the battery power to zero and control the engine to deliver wheel power to meet driver demand when the current battery state of charge is less than an associated threshold, a system efficient battery power is greater than zero, and the predicted battery energy usage is boosting.

9. The hybrid vehicle of claim 6, wherein the controller is further configured to operate the battery at a system efficient battery power when the current battery state of charge is greater than an associated threshold and the system efficient battery power is greater than zero.

10. A method for controlling a hybrid vehicle having an engine and a battery comprising:
    controlling battery power based on a current battery energy usage associated with operation of the battery at system efficient battery power relative to a predicted battery energy usage associated with operation of the engine at system efficient engine power during a future time window; and
    controlling the battery to operate at the system efficient battery power when a current battery state of charge is less than an associated threshold and the system efficient battery power is greater than zero.

11. The method of claim 10, wherein the system efficient engine power is based on a predicted vehicle speed and driver demand.

12. The method of claim 10, further comprising:
    controlling the battery to operate at the system efficient battery power when the system efficient battery power is below zero, the predicted battery energy usage is boosting, and a current battery state of charge exceeds an associated threshold.

13. The method of claim 10, further comprising:
    controlling the battery to operate at the system efficient battery power when a current battery state of charge is less than an associated threshold and the system efficient battery power is less than zero.

14. The method of claim 10, further comprising:
    controlling the engine to deliver wheel power to meet driver demand when a current battery state of charge exceeds an associated threshold, the system efficient battery power is less than zero, and the predicted battery energy usage is charging.

15. The method of claim 10, further comprising:
    controlling the battery to operate at the system efficient battery power when a current battery state of charge is less than an associated threshold, the system efficient battery power is greater than zero, and the predicted battery energy usage is charging.

16. The method of claim 10, further comprising:
    controlling the engine to deliver wheel power to meet driver demand when a current battery state of charge is less than an associated threshold, the system efficient battery power is greater than zero, and the predicted battery energy usage is boosting.

17. The method of claim 10, wherein the predicted battery energy usage is further based on a difference between operation of the engine, over the future time window, at system efficient engine power and operation of the engine at charge neutral engine power associated with zero battery power.

* * * * *